Sept. 11, 1962

H. MORTARA 3,053,423

DISPENSER CANISTERS

Filed Jan. 21, 1960

INVENTOR.
HOLY MORTARA
BY Thready & Thready
HIS ATTORNEYS.

United States Patent Office 3,053,423
Patented Sept. 11, 1962

3,053,423
DISPENSER CANISTERS
Holy Mortara, Chicago, Ill., assignor to Cole Vending Industries, Inc., Chicago, Ill., a corporation of Illinois
Filed Jan. 21, 1960, Ser. No. 3,950
1 Claim. (Cl. 222—567)

This invention relates to certain new and useful improvements in dispenser canisters. The invention is particularly designed for use in connection with beverage vending machines, in which one or more ingredients are discharged into a mixing bowl for delivery to a cup.

In such machines a mixing bowl of a circular type is generally provided. Connected to this bowl is a conduit for delivering a liquid ingredient to the bowl, which liquid ingredient by reason of the shape of the bowl is caused to take a swirling action about the interior of the bowl so as to assure a proper mixing with the powdered ingredient. An object of this invention is to provide a simple and inexpensive arrangement for directing the powdered ingredient to the bowl. In addition, an object of the invention is to provide such an arrangement whereby the delivery chutes may be easily and conveniently removed for purposes of cleansing.

Generally, in such machines, especially where a hot liquid ingredient is delivered to the bowl, considerable vapor or steam is generated. To guard against the powdered ingredient becoming solidified or dampened by such steam or vapor, it is the practice to provide an exhaust which withdraws the steam and vapor from within the interior of the machine. It is therefore an object of this invention to provide an arrangement which will guard against the powdered ingredient being carried out with the extaust.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 2:
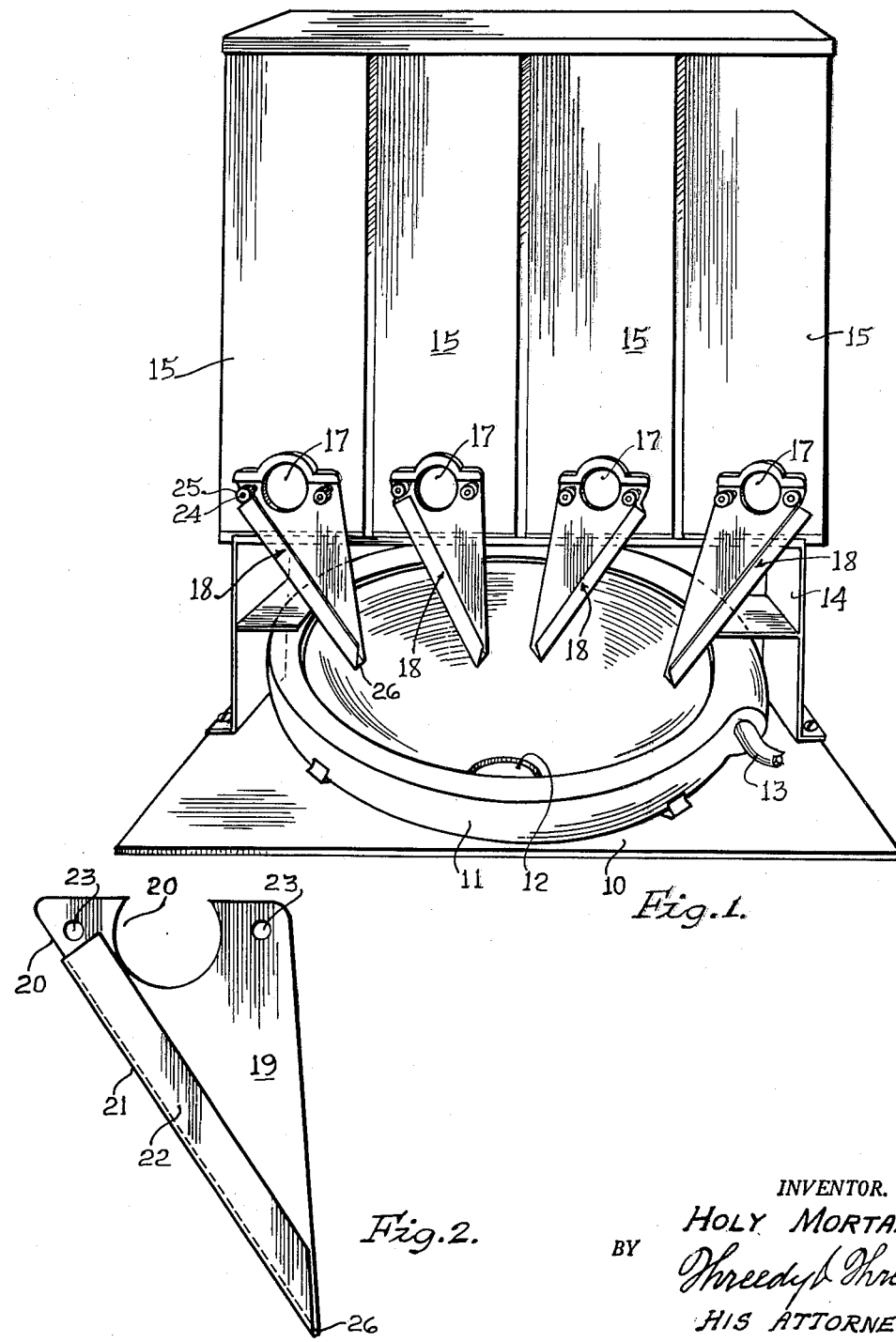
FIG. 1 is a perspective view of the invention.
FIG. 2 is an elevational view of one of the discharge chutes embodied in my invention.

The several objects of my invention are accomplished by the preferred form of construction shown in the accompanying drawings. In this connection, 10 indicates a support for a mixing bowl 11 which has a discharge opening 12. As shown, this mixing bowl 11 is circular in plan view and substantially bowl-shaped. There is connected for delivery to the mixing bowl 11 a conduit 13 which delivers the liquid ingredient to the bowl. The support 10 carries a mounting bracket 14 on which are mounted a plurality of canisters 15, each of which contains a powdered ingredient. These canisters 15 are of the conventional construction and have an arrangement whereby the powdered ingredient is ejected through discharge openings 17. Such mechanism has not been disclosed in this application, as it constitutes no part of the present invention. With each canister is arranged a combination guard and chute 18, there being four canisters and four of such chutes illustrated in the drawings. The number of these canisters may vary according to the requirement of the machine with which they are associated.

The combination guard and delivery chutes are of similar construction and each comprises a back plate 19 having an opening 20 at the upper end portion corresponding to the size of the discharge opening 17 of the canister 15. The plate 19 is substantially triangular in plan view. On the bottom edge 20 of the plate there is formed as an integral part thereof an extension 21 having its outer end portion turned upwardly as at 22. The bottom 21 and the portion 22 together with the back plate 19 provide a chute. The plate 19 at its upper end portion provides spaced openings 23 through which project the stud bolts 24 having threaded thereon nuts 25 which may be knurled to afford convenient removal when it is desired to remove the combination guard and chute for cleansing purposes.

It will be noted in the drawings that the discharge end 26 of each chute is disposed within the open area of the bowl 12 for purposes of delivering the powdered ingredient to a position within the bowl where it will come into contact with the swirling liquid ingredient delivered to such bowl through the conduit 13. The upturned end 22 of each chute guards against the ingredient being picked up by the air movements within the beverage machine caused by the exhaust means.

The arrangement thus described provides a simple and efficient construction for not only delivering the powdered ingredient to the mixing bowl, but also reducing to a minimum the waste of powdered ingredient which would otherwise be picked up and carried out of the machine by the exhaust.

While I have illustrated and described the preferred form of construction for carrying my invention into effect, this is capable of variation and modification without departing from the spirit of invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A combination guard and chute for a canister of a beverage machine in which the canister is provided with an opening in one side wall thereof, said guard and chute comprising (a) a plate of substantially triangular formation secured to the canister and extending downwardly with respect to the side wall to dispose the apex of the plate below the opening, (b) said plate having an opening formed therein opposite its apex and in registration with the opening formed in the side wall of the canister, (c) an extension extending laterally from one of the edges of said plate and having an edge portion bent substantially at right angles in parallel spaced relation with respect to said plate and forming together with said plate a chute extending downwardly from the canister at an inclination with respect thereto, (d) and means for connecting the plate to said side wall of the canister with the opening of said plate in registration with the opening of the side wall of the canister.

References Cited in the file of this patent
UNITED STATES PATENTS

| | | |
|---|---|---|
| 166,678 | Aldrich | Aug. 17, 1875 |
| 599,784 | How | Mar. 1, 1898 |
| 938,402 | Watrous | Oct. 26, 1909 |
| 1,373,521 | Neller | Apr. 5, 1921 |
| 1,949,387 | Hardcastle | Feb. 27, 1934 |
| 2,569,486 | Mills | Oct. 2, 1951 |
| 2,802,599 | Callahan et al. | Aug. 13, 1957 |
| 2,921,713 | Zanotto et al. | Jan 19, 1957 |
| 2,977,027 | Alden | Mar. 28, 1961 |